July 31, 1945.　　　　G. KEITH　　　　2,380,765
BRAKE SYSTEM FOR CONNECTED VEHICLES
Filed June 9, 1942
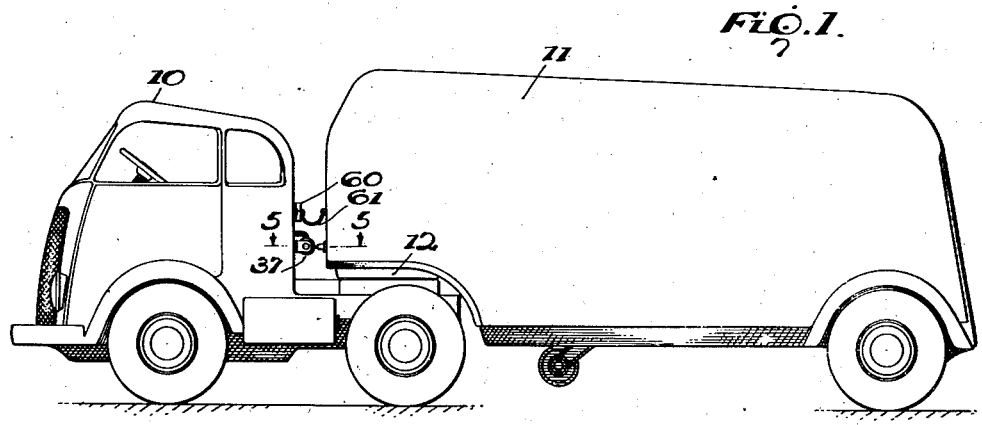
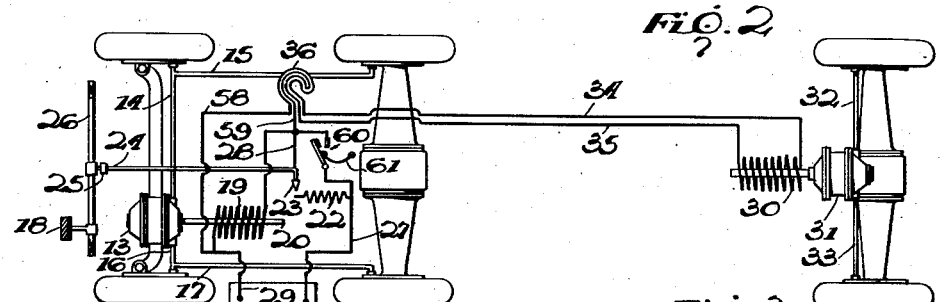
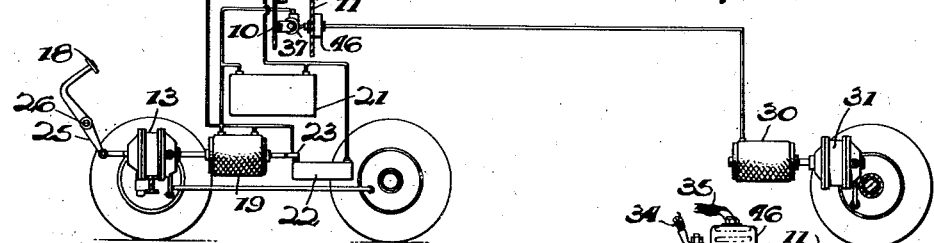
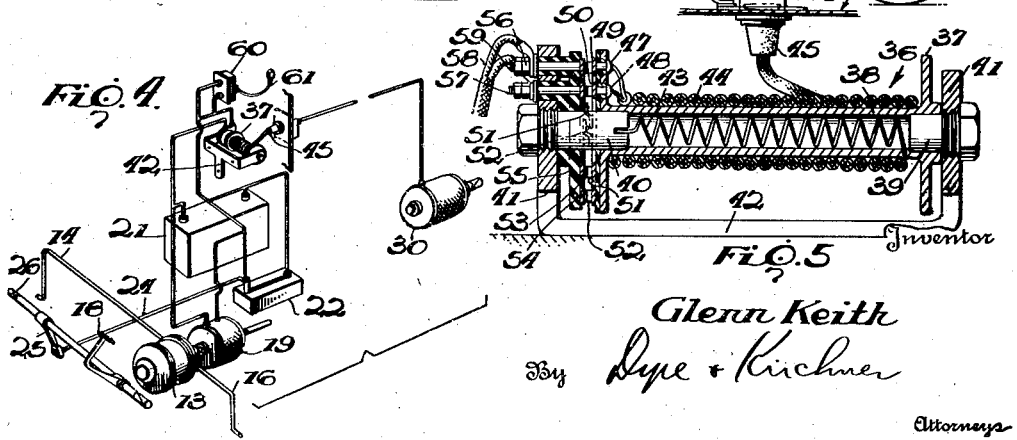
Inventor
Glenn Keith
By Dye + Kirchner
Attorneys Patented July 31, 1945

2,380,765

UNITED STATES PATENT OFFICE 2,380,765

BRAKE SYSTEM FOR CONNECTED VEHICLES

Glenn Keith, East Detroit, Mich.

Application June 9, 1942, Serial No. 446,368

2 Claims. (Cl. 188—3)

The present invention relates to braking systems for a plurality of connected vehicles under common control, such as a tractor and trailer combination or a number of separate and normally independent vehicles coupled together to form a train.

An important object of the invention is to provide means for normally applying and releasing the separate brakes of the several vehicles by a single actuating mechanism under the control of one operator, who is generally and preferably the driver of the leading vehicle. The system is so arranged that actuating means thus operated will apply braking force simultaneously to each of the vehicles.

A further object is to provide means automatically operable upon accidental separation of the vehicles, as by undesired uncoupling during movement, to apply the brakes of each vehicle so as to bring the separated elements of the combination of the train quickly to a stop.

Another object is to provide means of the character indicated which will be energized by a single source of power located in one of the vehicles, so that wasteful duplication of batteries and the like on the several vehicles is avoided.

Incidental objects are concerned with generally improving braking mechanisms for connected vehicles in respect of simplicity, economy of manufacture and operation, and ability to accomplish their intended purposes unfailingly under conditions of normal and abnormal operation.

An exemplification of the invention, comprising a preferred form of embodiment, is depicted on the accompanying drawing in which Figure 1 is a side elevational view of a tractor and trailer combination equipped with the present invention;

Fig. 2 is a plan view of the running gear of the combination, showing schematically the principal electrical instrumentalities and the circuits by which they are connected;

Fig. 3 is a side elevational view of the running gear showing the general plan of cable connections without attempting to indicate the individual conductors;

Fig. 4 is a phantom perspective view and is generally similar to Fig. 3, showing certain of the parts with their cable connections and without attempting to show the arrangement of the individual conductors in the circuits; and Fig. 5 is a detail cross sectional view, taken on the line 5—5 of Fig. 1, showing a reel by which electrical connection between the two vehicles is maintained during a considerable degree of physical separation of the vehicles resulting from accidental uncoupling.

Referring first to Fig. 1, the reference numeral 10 designates generally the tractor element of a combination which includes also the trailer vehicle 11. In this figure the vehicles are articulated by means of a coupling generally designated 12 more or less over a wheelbase common to the two vehicles. This arrangement is selected merely to exemplify one application of the principles of the invention. The two vehicles could as well be independent, non-articulated cars or the like, each provided with an independent pair of wheelbases and coupled together in any number to constitute any type of vehicle train. In the present explanation of the invention it should be kept in mind that its principles are in no way limited to application to vehicles constructed or connected as shown in Fig. 1. Consequently, the expression "leading vehicle" is to be understood as meaning the foremost vehicle in a train of any number, and the term "trailing vehicle" is to be understood as meaning a towed vehicle or any number of towed vehicles.

A related object is to provide means for connecting the several braking systems that will be exceedingly simple, inexpensive and foolproof, comprising merely an electric cord, plug and receptacle, instead of the brake rods or hydraulic lines which were frequently used in the prior art constructions and which involved obvious high cost of manufacture and maintenance and were troublesome to connect and disconnect.

The leading vehicle 10 is provided with a self-contained braking system of any suitable type and construction, such as the hydraulic braking system which is shown in Fig. 2 as comprising a master cylinder 13 connected by branches 14, 15, 16 and 17 to brakes on each of the wheels. The cylinder 13 of course contains the usual piston which is actuated through suitable connection with the braking pedal 18.

In the present illustrative construction the brake piston is electrically controlled by means 19, here shown conventionally as a solenoid having an armature 20 directly connected with the brake cylinder piston rod. This showing of the instrumentality 19 is suggestive only, inasmuch as the instrumentality may be any convenient type of electrically energized motive means directly connected to the individual wheel brakes or operable on these brakes through the medium of any suitable linkage or the hydraulic lines shown in the drawing.

An electric storage battery 21 is carried on the leading vehicle to energize the motive means 19 to apply the brakes to this vehicle. Control of the energy supply is effected by a rheostat 22 the movable contact 23 of which is normally in open circuit position but is movable to closed circuit position, cutting out more or fewer turns of the rheostat, when the brake pedal 18 is depressed against the action of a conventional return spring (not shown). An operating rod 24 connects the movable member 23 of the rheostat with an arm 25 depending from a brake pedal rock shaft 26.

It will be recognized that when the pedal 18 is depressed more or less current will flow from the battery 21 through the lead 27, rheostat 22—23, lead 28, solenoid or other motor device 19 and back to the battery through the connection 29. Thus the brakes are applied to the leading vehicle, and of course they are released when the brake pedal 18 is restored to normal position by its spring.

It is an object of the invention to apply the brakes of the trailing vehicle 11 simultaneously as the brakes of the leading vehicle are applied, and to produce this result without requiring the vehicles to be connected by anything except electrical conductors. This is accomplished by providing a solenoid or the like 30 on the trailing vehicle, constructed like the element 19 of the leading vehicle and similarly connected to a hydraulic brake cylinder 31 which in turn is connected by branches 32, 33 to the wheel brakes of the trailing vehicle. Leads 34, 35 connect the trailer solenoid 30 with the conductor 28 and the conductor 29 respectively, all as is evident in Fig. 2.

It will be observed that the solenoids 19 and 30 are connected in parallel with the battery 21 when the circuit through the rheostat 22 is closed, so that the brakes of both vehicles are simultaneously applied and of course simultaneously retracted when the circuit through the rheostat becomes opened.

In Fig. 2 the reference numeral 36 indicates generally a length of loose play in the leads 34, 35 which is provided in order to maintain the electric connection between the vehicles throughout some predetermined degree of physical separation, such as might result from accidental uncoupling during operation. The purpose is to insure control of the brakes of the several vehicles by the operator who manipulates the pedal 18, even though the vehicles become abnormally separated.

The loose play connection 36 is conveniently embodied in the structure best shown in Fig. 5. This comprises a reel 37 having a hollow hub or spindle 38 which is journalled on a pair of short pintles 39, 40 instanding from the parallel legs 41, 41 of a yoke bracket 42. This bracket is affixed to some part of the body of the leading vehicle 10, as shown in Fig. 1. A torsion spring 43 is contained in the hub of the reel and one end is connected to one of the pintles and the other end is made fast on the reel, so that the tension of the spring will tend to wind the reel back after it has been rotated.

The reel carries a long length of double wire cord 44, terminating in a plug 45 received in a receptacle 46 on the trailer vehicle and connected to the leads 34, 35. The other end of the cord 44 has its two wires separated and passed separately through insulated connections 47, 48 in one flange of the reel. The connections 47, 48 make contact with conductor rings 49, 50 on the outer face of the reel flange, from which a number of circumferentially equidistantly spaced integral brushes 51, 52 are struck out to wipe a pair of rings 53, 54 carried by an insulating plate 55 which is made fast on the adjacent leg 41 of the bracket 42 and which carries binding posts 56, 57 connected respectively to the rings 53, 54. To these binding posts are connected a wire 58 which, as is shown in Fig. 2, is connected to the solenoid 19 and the conductor 29, and a wire 59 which, as is shown in Fig. 2, is connected to the lead 28.

It will be evident that no matter how far the vehicles separate, within the limits set by the length of the cord 44, the two braking systems will remain electrically connected and jointly operable by the pedal 18, since the cord 44 will be paid out during separation and the brushes 51, 52 will maintain contact between the leads 58, 59 of the leading vehicle and conductors 34, 35 of the trailing vehicle.

In order to render the brakes of both vehicles, or of all the vehicles of the train, automatically applicable upon accidental uncoupling, I interpose a switch 60 in the system. This switch, as best appears in Fig. 1, is mounted on the leading vehicle in the vicinity of the reel 37. It may be a conventional type of toggle switch which is normally open but has its operating arm connected by a loose chain or cord 61 to a point on the wall of the trailing vehicle. The length of this chain or the like is such that it will become taut and close the switch immediately after the vehicles separate more than is permitted by the coupling 12, i. e., only after the vehicles become accidentally uncoupled. The construction of the switch 60 is such that its contacts will remain closed after they have been moved to closed position. The switch, as appears in Fig. 2, is interposed between the conductor 28 and the terminal of the rheostat which is connected to the lead 27 from the battery 21, so that when the switch is closed it shorts the rheostat out of the brake operating circuits. Hence, as soon as the vehicles separate upon accidental uncoupling, the battery 21 becomes directly connected with both the solenoids or the like 19 and 30, as will be evident from Fig. 2. This of course has the effect of immediately applying full braking power to both vehicles, so as to bring them promptly to a stop. The length of the cord 44 is so selected as to insure maintenance of the necessary electrical connection throughout a degree of separation which the vehicles will not attain before they can be brought to a halt.

It will be evident that when leading and trailing vehicles are to be connected together it is necessary merely to insert the plug 45 into the receptacle 46 and connect the chain 61 to its hook or eye on the trailing vehicle. Obviously this is accomplished in a few seconds, and the vehicles are then operatively connected for simultaneous actuation of their brakes under the control of the operator of the combination or train and for continued emergency application of their brakes throughout any expected degree of physical separation resulting from accidental uncoupling. When it is desired to uncouple the vehicles it is an equally simple matter to disconnect the plug from the receptacle and the chain from its hook or eye.

As has been stated, the drawing is schematic and this description is representative merely of a preferred embodiment. Thus, the particular character of the electrically energized means 19 and 30 and the manner in which they operate on the brakes per se forms no part of the invention, since other and specifically different elements may be substituted for those shown or suggested. Similarly, other details of the construction may be altered within the spirit of the invention as pointed out by the appended claims.

I claim:

1. In a braking system for a pair of connected vehicles, separate braking means for each vehicle, electrically energized means carried on each vehicle for operating the braking means thereof, a source of electric current carried by one only of the vehicles, circuits for connecting said source with said several electrically energized means and including a length of wire adapted to be paid out on separation of the vehicles to maintain the connection between said circuits throughout a predetermined amount of separation, means on the first named vehicle for controlling simultaneously the flow of electric current from said source to each of the electrically energized means, and means for connecting said source with the electrically energized means on each of the vehicles automatically on separation of the vehicles in an amount less than said predetermined amount.

2. In a braking system for connected vehicles, a brake and an electric power device for operating the same mounted on each of the vehicles, a single source of energy for all of said power devices, said source being mounted on one only of the vehicles, control means on said one vehicle for said source and power devices, conductor means connecting the vehicles through a predetermined degree of separation of the vehicles, and a normally open switch adapted to close to connect the source and the power devices automatically upon separation of the vehicles less than said predetermined degree.

GLENN KEITH.